(12) United States Patent
Zhang et al.

(10) Patent No.: US 6,651,088 B1
(45) Date of Patent: Nov. 18, 2003

(54) METHOD FOR REDUCING COHERENT MISSES IN SHARED-MEMORY MULTIPROCESSORS UTILIZING LOCK-BINDING PREFETCHS

(75) Inventors: Zheng Zhang, San Jose, CA (US); Sekhar R. Sarukkai, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/358,582

(22) Filed: Jul. 20, 1999

(51) Int. Cl.[7] .............................................. G06F 15/167
(52) U.S. Cl. ....................... 709/213; 711/131; 711/150; 711/152; 711/137; 711/141
(58) Field of Search ................................ 709/213, 223; 711/147–173

(56) References Cited

U.S. PATENT DOCUMENTS

| | | | | |
|---|---|---|---|---|
| 4,587,609 A | * | 5/1986 | Boudreau et al. ............ | 710/200 |
| 4,775,955 A | * | 10/1988 | Liu .............................. | 711/145 |
| 5,136,691 A | * | 8/1992 | Baror .......................... | 711/128 |
| 5,228,136 A | * | 7/1993 | Shimizu et al. .............. | 711/121 |
| 5,237,694 A | * | 8/1993 | Horne et al. ................. | 710/200 |
| 5,553,267 A | * | 9/1996 | Herlihy ........................ | 700/5 |
| 5,704,053 A | * | 12/1997 | Santhanam .................. | 717/158 |
| 5,761,468 A | * | 6/1998 | Emberson .................... | 712/207 |
| 5,809,537 A | * | 9/1998 | Itskin et al. ................. | 711/146 |
| 5,829,029 A | * | 10/1998 | Shelly et al. ................ | 711/133 |
| 5,829,042 A | * | 10/1998 | Leung ......................... | 711/137 |
| 5,835,947 A | * | 11/1998 | Cherabuddi .................. | 711/125 |
| 5,860,126 A | * | 1/1999 | Mittal .......................... | 711/141 |
| 5,930,507 A | * | 7/1999 | Nakahira et al. ............ | 717/160 |
| 5,987,550 A | * | 11/1999 | Shagam ....................... | 710/119 |
| 5,996,061 A | * | 11/1999 | Lopez-Aguado et al. ... | 712/207 |
| 6,006,299 A | * | 12/1999 | Wang et al. ................. | 710/108 |
| 6,014,728 A | * | 1/2000 | Baror .......................... | 711/133 |
| 6,052,760 A | * | 4/2000 | Bauman et al. ............. | 711/119 |
| 6,076,126 A | * | 6/2000 | Shagam ....................... | 710/108 |
| 6,092,097 A | * | 7/2000 | Suzuoka ...................... | 709/201 |
| 6,094,709 A | * | 7/2000 | Baylor et al. ............... | 711/118 |
| 6,134,633 A | * | 10/2000 | Jacobs ......................... | 711/137 |
| 6,138,213 A | * | 10/2000 | McMinn ...................... | 711/137 |
| 6,157,993 A | * | 12/2000 | Lewchuk ..................... | 711/213 |
| 6,230,230 B1 | * | 5/2001 | Joy et al. ..................... | 710/200 |
| 6,247,025 B1 | * | 6/2001 | Bacon ......................... | 707/102 |
| 6,247,107 B1 | * | 6/2001 | Christie ....................... | 711/216 |
| 6,253,306 B1 | * | 6/2001 | Ben-Meir et al. ........... | 712/207 |
| 6,272,516 B1 | * | 8/2001 | Angle et al. ................ | 709/102 |

\* cited by examiner

*Primary Examiner*—Patrice Winder
*Assistant Examiner*—Syed A. Zia

(57) ABSTRACT

A method for operating a shared memory computer system to reduce the latency times associated with lock/unlock code sequences. The computer system includes a shared memory and a plurality of processors. When one of the processors wishes to modify a shared variable stored in the shared memory, the processor must first request and receive a lock from the shared memory. The lock prevents any other processor in the computer system from modifying data in the shared memory during the locked period. In the present invention, a list of variables in the shared memory that are shared by two or more of the processors is generated. When one of the processors is granted a lock, a prefetch instruction is executed for each variable in the list. Each prefetch instruction specifies the processor receiving the lock as the destination of the data specified in that prefetch instruction. The list may be generated by a compiler during the compilation of a program that is to run on one of the processors. Alternatively, the list can be generated while the program is running either with test data or during the normal execution of the program. The list generation and prefetch instruction executions may be carried out by modifying the program and/or shared memory controller code or via special purpose hardware that monitors the memory bus.

9 Claims, 1 Drawing Sheet

METHOD FOR REDUCING COHERENT MISSES IN SHARED-MEMORY MULTIPROCESSORS UTILIZING LOCK-BINDING PREFETCHS

FIELD OF THE INVENTION

The present invention relates to computer systems, and more particularly, to multiprocessor computer systems in which a plurality of processors share the same memory.

BACKGROUND OF THE INVENTION

One class of computer system has two or more main processor modules for executing software running on the system and a shared main memory that is used by all of the processors. The main memory is generally coupled to a bus through a main memory controller. Typically, each processor also has a cache memory, which stores recently used data values for quick access by the processor.

Ordinarily, a cache memory stores both the frequently used data and the addresses where these data items are stored in the main memory. When the processor seeks data from an address in memory, it requests that data from the cache memory using the address associated with the data. The cache memory checks to see whether it holds data associated with that address. If so, the cache memory returns the requested data directly to the processor. If the cache memory does not contain the desired information (i.e., a "cache miss" occurs), the cache requests the data from main memory and stalls the processor while it is waiting for the data. Since cache memory is faster than main RAM memory, this strategy results in improved system performance.

Cache copies of data are kept coherent via coherent protocols. The memory system typically has a directory that contains one line for each memory line in the main memory. The directory stores information specifying the state of each memory line and the processors whose cache memories have copies of the line. If the line is dirty, only one processor has a valid copy of the line.

When a cache miss occurs, the processor suffering the miss requests the data from the main memory. The memory controller examines the directory to determine if the requested cache line is dirty or clean. If the cache line is clean, the main memory supplies the data directly to the processor. If the cache line is dirty, the main memory causes the cache having the current valid copy to supply the cache line to the requesting processor.

One class of data stored in the main memory may be used by more than one processor in the system. Special precautions must be taken to protect the integrity of this data during operations that modify that data. Simultaneous load and store operations from multiple processors can cause data-race conditions that destroy the coherency of the data. Hence, when one processor performs a "read, modify, write" to a shared variable, all other processors must be prevented from using the data during the time the first processor is performing the operation. This protection is typically provided by a locking mechanism. When a processor wishes to perform an operation that alters the shared data, the processor first requests a memory lock from the memory controller. Once the memory controller grants the lock, the processor proceeds with its operations. At the end of the operations, the processor sends a message to the central controller that unlocks the data. During the locked period, no other processor can gain access to the locked data.

The time delays inherent in this type of locking scheme can be very large. The time to obtain a lock is inherent in sending a message to the main memory controller on the bus and receiving a response. If the main memory is already locked, the process must be repeated until a lock is granted to the processor. The processor must then read the data that is to be modified. This read operation often generates a cache miss. Hence, the processor must stall while the data is obtained from main memory or some other processor in the system. If the data is in the main memory, the latency time for the read is about the same as that required to obtain the lock. If the data is stored in the cache of one of the other processors, the latency time is at least twice the lock latency time. This additional latency time substantially decreases the efficiency of the entire computer system, since it increases the time of the "read, modify, write" in the processor in question, as well as increasing the time during which other processors will be locked out of the main memory.

Broadly, it is the object of the present invention to provide an improved memory system.

It is a further object of the present invention to provide a memory system that has reduced latency times during lock operations.

These and other objects of the present invention will become apparent to those skilled in the art from the following detailed description of the invention and the accompanying drawings.

SUMMARY OF THE INVENTION

The present invention is a method for operating a shared memory computer system to reduce the latency times associated with lock/unlock code sequences. The computer system includes a shared memory and a plurality of processors. When one of the processors wishes to modify a shared variable stored in the shared memory, the processor must first request and receive a lock from the shared memory. The lock prevents any other processor in the computer system from modifying data in the shared memory during the locked period. In the present invention, a list of variables in the shared memory that are shared by two or more of the processors is generated. When one of the processors is granted a lock, a prefetch instruction is executed for each variable in the list. Each prefetch instruction specifies the processor receiving the lock as the destination of the data specified in that prefetch instruction. The list may be generated by a compiler during the compilation of a program that is to run on one of the processors. Alternatively, the list can be generated while the program is running either with test data or during the normal execution of the program. The list generation and prefetch instruction executions may be carried out by modifying the program and/or shared memory controller code or via special purpose hardware that monitors the memory bus.

DETAILED DESCRIPTION OF THE INVENTION

Figure 1:
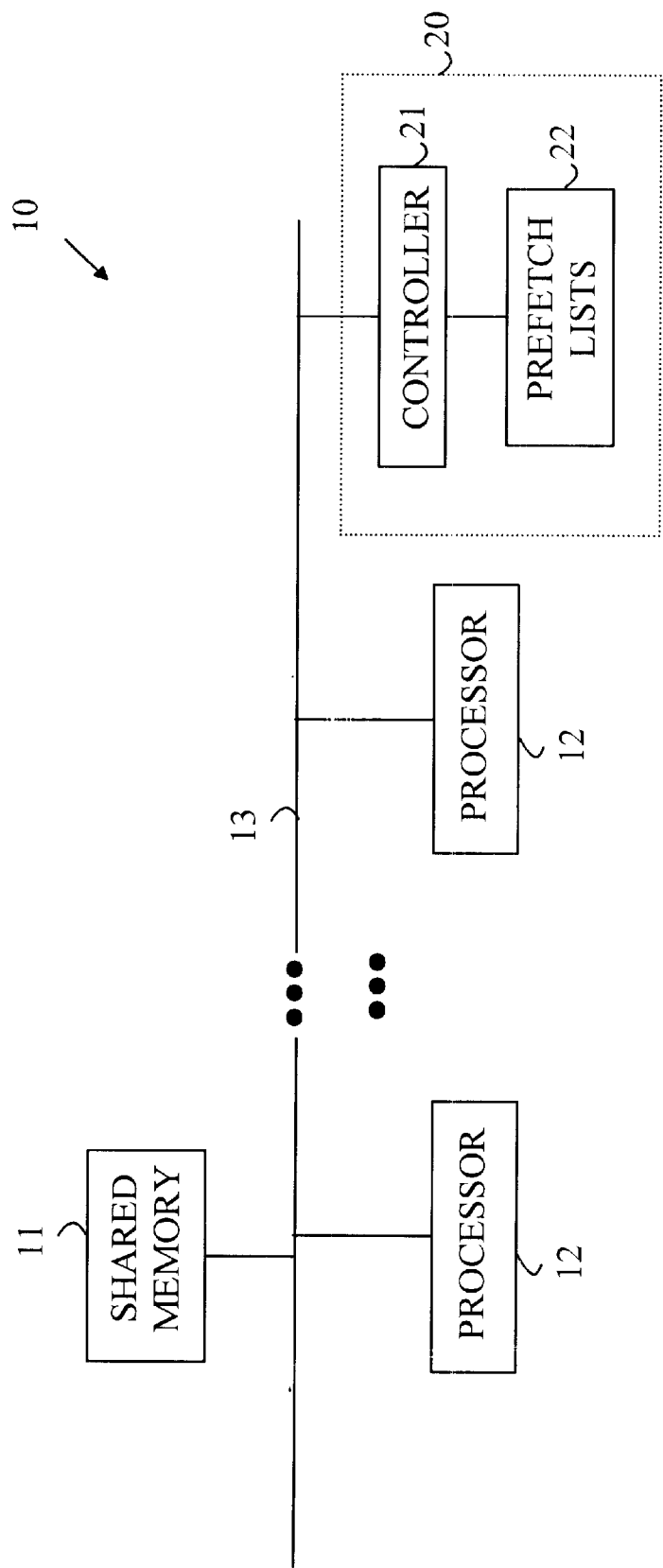
FIG. 1 is a block diagram of a multi-processor, shared memory system in which a prefetch processor according to the present invention has been inserted.

The present invention is based on the observation that the data that will be needed after the lock is achieved is often known at the time the lock is requested. Hence, one or more prefetch instructions may be executed as part of the locking operation without waiting for a cache miss to occur for that data. Each prefetch instruction includes the address of the cache line in which the data is stored and the address of the processor that is to receive the data.

In the preferred embodiment of the present invention, the prefetch instructions are inserted by the compiler. Each time the compiler encounters a lock-unlock pair of commands, the compiler examines the instructions between the lock command and the unlock command for data items that may cause cache misses and generates prefetch instructions for those items that may cause cache misses. These instructions are preferably inserted just after the lock acquiring code. If the precise variables being accessed during the lock-unlock period are not ascertainable, then the compiler inserts a prefetch for all variables that are declared as shared and that may be accessed during the lock-unlock period.

While this embodiment of the present invention is relatively simple to implement in software; the insertion of the prefetch instructions can decrease the efficiency of the program at runtime. The prefetch instructions increase the size of the code. In addition, the prefetch instructions require address computations when placed in the code.

The list of variables that are likely to cause cache misses after a lock can also be approximated with the aid of run-time optimization programs that provide performance data when the program is run with representative test data. In this type of system, the "instrumentation code" introduced into the program by the optimizer stores a list of variables that caused cache misses between lock-unlock instruction pairs. The optimizer can store one such list for the entire program or a separate list for each lock-unlock pair in the program. The latter strategy requires more storage space; however, it also provides the smallest list of prefetchs at execution. This embodiment eliminates the address computations discussed above, since the list stores the address of the variable causing the prefetch.

The prefetch instructions can be originated from the processor running the code or from the main memory controller. The latter mode assumes that the list is accessible to the main memory controller. If the list is executed from the processor, the compiler must insert the list or a jump to the list into the code. Hence, the problems associated with code size are still present.

The main memory controller can store a list associated with each processor. When a lock request is granted to a processor, the main memory controller accesses the list and executes the prefetch instructions. This embodiment has the advantage of not requiring any increase in the code size.

The above-described embodiments of the present invention have all utilized software to implement the prefetch instructions following a lock grant. However, embodiments that utilize a special hardware processor may also be constructed. Refer now to FIG. 1, which is a block diagram of a multi-processor, shared memory system 10 in which a prefetch processor 20 according to the present invention has been inserted. When a processor 12 wishes to lock memory 11, it sends a request on bus 13 to the controller in memory 11. That request includes data identifying the processor. Prefetch processor 20 includes a controller 21 that snoops on bus 13.

Prefetch processor 20 also includes a memory 22 that stores a list of prefetches associated with each processor. On detecting a lock being granted on the bus, the controller 21 checks the table in memory 22 to see if there is a list associated with the processor receiving the lock. If no list exists, the controller 21 creates a list and records the addresses associated with coherent misses during the time the lock is active. The next time a lock is detected for that processor, the controller 21 automatically issues prefetches to the memory 11 for the addresses in that list specifying the processor in question as the destination for the data.

Various modifications to the present invention will become apparent to those skilled in the art from the foregoing description and accompanying drawings. Accordingly, the present invention is to be limited solely by the scope of the following claims.

What is claimed is:

1. In a method for operating a shared memory computer system comprising a shared memory and a plurality of processors, wherein one of said processors wishing to modify a shared variable stored in said shared memory must first request and receive a lock from said shared memory, said lock preventing any other processor in said computer system from modifying data in said shared memory; the improvement comprising:

generating a list of variables in said shared memory that are shared by two or more of said processors; and executing a prefetch instruction for each variable in said list upon one of said processors receiving one of said locks, each prefetch instruction specifying said processor receiving said lock as the destination of the data specified in that prefetch instruction.

2. The method of claim 1 wherein said list is generated by a compiler during the compilation of computer code specifying a program to be run on one of said processors.

3. The method of claim 1 wherein said step of executing said prefetch instructions is performed by said processor receiving said lock.

4. The method of claim 1 wherein said list is generated by a run-time optimization program that executes a program to be run on one of said processors with test data and observes the running of said program.

5. The method of claim 1 wherein said list is generated by a controller coupled to a bus on which said lock requests are transmitted to said shared memory, said controller recording addresses of cache misses that occur between the receipt of one of said locks and a command relinquishing that lock.

6. The method of claim 5 wherein said controller executes said prefetch instructions.

7. The method of claim 1 wherein said shared memory executes said prefetch instructions.

8. In a shared memory computer system comprising a shared memory and a plurality of processors, wherein one of said processors wishing to modify a shared variable stored in said shared memory must first request and receive a lock from said shared memory, said lock preventing any other processor in said computer system from modifying data in said shared memory, the improvement comprising a controller coupled to a bus that is shared with said shared memory, said controller recognizing said lock commands and unlock commands on said bus, said controller also recognizing cache misses on said bus, said controller generating a list of variables in said shared memory that are shared by two or more of said processors; and executing a prefetch instruction for each variable in said list upon one of said processors receiving one of said locks, each prefetch instruction specifying said processor receiving said lock as the destination of the data specified in that prefetch instruction.

9. The shared memory computer system of claim 8 wherein said controller generates said list by recording addresses of cache misses from one of said processors between that processor receiving one of said locks and said processor relinquishing said lock.

* * * * *